United States Patent
Schenk et al.

(10) Patent No.: US 10,263,540 B2
(45) Date of Patent: Apr. 16, 2019

(54) SUPPRESSION OF A DC COMPONENT IN A TRANSFORMER OF A VOLTAGE CONVERTER

(71) Applicant: Robert Bosch GmbH, Stuttgart (DE)

(72) Inventors: Rene Schenk, Tamm (DE); Stephan Binhack, Knittlingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/314,559

(22) PCT Filed: Apr. 9, 2015

(86) PCT No.: PCT/EP2015/057708
§ 371 (c)(1),
(2) Date: Nov. 29, 2016

(87) PCT Pub. No.: WO2015/185249
PCT Pub. Date: Dec. 10, 2015

(65) Prior Publication Data
US 2017/0201190 A1 Jul. 13, 2017

(30) Foreign Application Priority Data
Jun. 2, 2014 (DE) ........................ 10 2014 210 325

(51) Int. Cl.
*H02M 1/08* (2006.01)
*H02M 7/5387* (2007.01)
(Continued)

(52) U.S. Cl.
CPC ......... *H02M 7/53871* (2013.01); *H02M 1/08* (2013.01); *H02M 7/48* (2013.01);
(Continued)

(58) Field of Classification Search
CPC ...... H02M 1/08; H02M 7/48; H02M 7/53871; H02M 2001/0009; H02M 2007/4803; H02M 7/5387
(Continued)

(56) References Cited

U.S. PATENT DOCUMENTS

| 4,404,623 A | 9/1983 | Jourdan |
| 6,356,461 B1 | 3/2002 | Jacobs |

(Continued)

FOREIGN PATENT DOCUMENTS

| DE | 102012108456 A1 | 3/2013 |
| EP | 0580192 | 1/1994 |

OTHER PUBLICATIONS

International Search Report for Application No. PCT/EP2015/057708 dated Jun. 18, 2015 (English Translation, 2 pages).

*Primary Examiner* — Harry R Behm
*Assistant Examiner* — Lorena D Bruner
(74) *Attorney, Agent, or Firm* — Michael Best & Friedrich LLP

(57) ABSTRACT

The present invention relates to a voltage converter comprising a primary side which has a full bridge device which is configured for the purpose of receiving a first DC voltage from a voltage source at a first amplitude and to transmit same to a primary coil arranged in the primary side, comprising a control unit which is designed for the purpose of controlling the full bridge device using PWM signals having phases shifted counter to one another, wherein the control unit is configured to detect an asymmetry in the current supplied to the primary coil based on a current profile in the primary coil, wherein the control unit is designed to compensate for a detected asymmetry by adjusting the PWM signals. The present invention further relates to a corresponding method.

19 Claims, 6 Drawing Sheets

(51) Int. Cl.
  *H02M 7/48* (2007.01)
  *H02M 1/00* (2006.01)
(52) U.S. Cl.
  CPC .............. *H02M 2001/0009* (2013.01); *H02M 2007/4803* (2013.01)
(58) Field of Classification Search
  USPC .......................................................... 363/17
  See application file for complete search history.

(56) References Cited

U.S. PATENT DOCUMENTS

| | | |
|---|---|---|
| 2005/0041439 A1* | 2/2005 | Jang .................. H02M 3/33569 363/17 |
| 2008/0158914 A1 | 7/2008 | Bakker |
| 2008/0198631 A1 | 8/2008 | Zeng et al. |
| 2010/0157257 A1* | 6/2010 | Nishizawa ......... H05B 41/2928 353/85 |
| 2010/0195353 A1 | 8/2010 | Nishiyama et al. |
| 2012/0113698 A1* | 5/2012 | Inoue ...................... H02M 1/08 363/123 |
| 2013/0088895 A1 | 4/2013 | Ye et al. |
| 2013/0314949 A1 | 11/2013 | Chi et al. |

* cited by examiner

SUPPRESSION OF A DC COMPONENT IN A TRANSFORMER OF A VOLTAGE CONVERTER

BACKGROUND OF THE INVENTION

The present invention relates to a voltage converter and a method for controlling a voltage converter.

Voltage converters are used today in a variety of different applications. For example, DC converters, also referred to as DC/DC converters, may be used in electric vehicles in order to convert a voltage of a vehicle battery into a voltage suitable for the respective consumers, for example, a drive motor.

Voltage converters may have different topologies. The possible converter topologies are in particular grouped according to the required converter power. For power levels up to approximately 100 watts, for example, so-called forward converters or flyback converters may be used. For power levels above 100 watts, for example, half-bridge voltage converters may be used, and for power levels of approximately 200 watts to above 1000 watts, so-called "zero-voltage switching" full-bridge voltage converters may be used.

For example, US 2013 314 949 A1 describes such a full-bridge voltage converter.

Such full-bridge voltage converters may be driven by means of different switching strategies. One possibility is to drive the full-bridge voltage converter by means of PWM signals, in which the phases are shifted relative to one another.

In the case of full-bridge converters, four switching signals are required, wherein two switching signals are jointly configured in each case in such a way that one of the terminals of the converter coil is connected to a positive supply voltage and one of the terminals of the converter coil is connected to a negative supply voltage. For the sake of simplicity, each such pair of control signals will be referred to below as a PWM signal.

Generally, these PWM signals are provided in each case with a PWM duty cycle of 50%. If these PWM signals are then phase-shifted relative to one another, different supply intervals may be set, in which the converter coil is supplied with electrical energy from one energy source. In the sections in which the "ON" intervals of the two PWM signals do not overlap, the inductive oscillation circuit is in a freewheeling state.

When driving such voltage converters, it is important to detect saturation of the converter transformer, which may occur due to possible component tolerances and a resulting asymmetrical current feed to the converter transformer.

If the converter transformer is driven by asymmetrical currents, it may go into saturation. However, during saturation, the inductance of the converter transformer decreases, and the currents within the converter transformer thus increase for the same voltage. This may result in damage to the converter transformer or the upstream electrical components.

In order to prevent this, the currents which flow into the converter transformer may be measured. For this purpose, a current sense transformer is generally placed at the positive supply line of the full bridge of the voltage converter. However, since a current always flows in the same direction through this current sense transformer, this current sense transformer goes into saturation and can no longer be used for measuring the current.

For this reason, when driving the full bridge, a reset phase is introduced in each case, which switches the supply line of the full bridge at zero current, thus preventing saturation of the current sense transformer.

A block diagram of a voltage converter corresponding to this principle is shown in FIG. 6. The voltage converter has a full bridge with four switches S1 to S4, in the transverse branch of which a transformer T1 is arranged. A measuring transformer T2 is situated in one supply line of the full bridge.

However, it is disadvantageous that due to the reset phase, in which no current is allowed to flow, the control or regulating range for the PWM signals is limited. However, in particular in the case of voltage converters for high power levels, it is desirable to be able to use the entire control or regulating range for the voltage conversion.

SUMMARY OF THE INVENTION

A voltage converter having a primary side which includes a full-bridge device which is designed to receive a first DC voltage from a voltage source having a first amplitude and to route it to a primary coil arranged in the primary side, including a control device which is designed to drive the full-bridge device via PWM signals having phases which are shifted relative to one another, wherein the control device is designed to detect an asymmetry in the current supplied to the primary coil based on a current profile in the primary coil, wherein the control device is designed to balance a detected asymmetry via an adjustment of the PWM signals. For example, the balancing may occur as a result of there being a deviation from the symmetrical 50% duty cycle drive in one half bridge, but the other half bridge continuing to be driven at a 50% duty cycle.

Furthermore, the following is provided:

A method for controlling a voltage converter having a primary coil supplied with a voltage via a full-bridge device, including the steps of driving the full-bridge device via PWM signals having phases which are shifted relative to one another, detecting an asymmetry in the current supplied to the primary coil based on a current profile in the primary coil, and balancing the detected asymmetry via an adjustment of the PWM signals.

The present invention is based on the finding that it is possible to measure the current which flows into the primary coil, between the full-bridge device and the primary coil, via a measuring device which is not able to measure direct current, and nonetheless to gather a piece of information about the DC component in the current.

For this purpose, the present invention provides for detecting the profile of the current in the primary coil, and for drawing an inference about the DC component in the current based on the profile of the current.

Since a direct current drives the primary coil into saturation, resulting in a decrease in the inductance of the primary coil, the current flowing through the primary coil also increases more rapidly in such a case than would be the case due only to the voltage and the nominal inductance of the primary coil.

The profile of the current may thus be used as an indicator of whether an asymmetrical current flows in the primary coil of the voltage converter.

In connection with this patent application, detection of the asymmetry based on the current profile means that any variable is detected which allows an assertion to be made about the current flow within one PWM cycle or multiple PWM cycles. This may be an individual measured value as well as a series of measured values.

Generally, a so-called peak current control is used for the described voltage converter type. This requires a current measurement which is able to measure the DC component. With respect to this control, in each PWM cycle, the primary coil is connected to the voltage source until a predefined current value (peak current) has been reached. A switch is then made to freewheeling mode. This control automatically provides for a symmetrical current flowing through the primary coil.

Unfortunately, until now, no microcontrollers yet support this control method via their integrated PWM generation units. For this reason, for control via microcontrollers, driving at a predefined duty cycle is preferable; however, according to a widespread school of thought, this is problematic due to potential problems with asymmetry.

Advantageous specific embodiments and refinements result from the subclaims and from the description with reference to the figures.

In one specific embodiment, the voltage converter includes a measuring transformer which is arranged in a diagonal branch of the full-bridge device and which is coupled to the control device in order to provide a value of a current in the primary coil to the control device. With the aid of a measuring transformer, it is possible to carry out galvanically decoupled measurement and to operate the control device, for example, at 12 volts on the low-voltage side.

In one specific embodiment, the control device is designed to detect the current profile in the primary coil via the detection of at least one current value in each case in an interval of the PWM signals in which the primary coil is coupled to the voltage source via the full-bridge device.

In one specific embodiment, the control device is designed to detect the at least one current value within the last 30 percent, in particular the last 20 percent or the last 10 percent, of the respective interval of the PWM signals or in the center of the respective interval of the PWM signals. If current values are detected at the end of an interval in which the primary coil is coupled to the voltage source via the full-bridge device, the profile of the current in the coil may be detected in a simple manner. This is described in greater detail, for example, in connection with FIG. 4.

The suitable sampling point may also be selected as a function of the duty cycle which has been set.

In one specific embodiment, the control device is designed to detect the current profile in the primary coil via the detection of at least one current value in an interval of the PWM signals in which the primary coil is not coupled to the voltage source via the full-bridge device. If the current is detected in the so-called freewheeling phase of the primary coil, it is also possible to draw an inference about the current in the primary coil in a simple manner. The freewheeling phase refers to the time interval in which the primary coil is not coupled to the voltage source via the full-bridge device.

In one specific embodiment, the control device is designed to detect the current profile in the primary coil via the detection of a plurality of current values. A plurality of current values allows an approximate reconstruction of the current profile and thus also the identification of an asymmetrical current in the primary coil.

In one specific embodiment, the control device is designed to detect two current values and to detect the slope of the current profile in the primary coil via the differentiation of the two current values. The slope of the current profile allows an inference to be drawn about a varying coil inductance of the primary coil and thus an asymmetrical current in the primary coil.

In one specific embodiment, the control device is designed to detect one current value in each case in two consecutive cycles of the PWM signals, and based on a difference between the current values, to detect the current profile in the primary coil. Since, in two consecutive cycles, one of the cycles is always a positive cycle and the other cycle is always a negative cycle, an asymmetrical current may be also identified via a comparison of the currents in the two cycles.

In one specific embodiment, the control device has a circuit including switched capacitors which is designed to detect the difference between the current values in two consecutive cycles of the PWM signals, wherein the control device is designed to detect the current profile in the primary coil based on the detected difference. This allows very simple detection of the current difference in two consecutive cycles.

The embodiments and refinements mentioned above may be combined in any arbitrary manner if expedient. Further possible embodiments, refinements, and implementations of the present invention also include combinations of not explicitly mentioned features of the present invention previously described or described below with respect to the exemplary embodiments. In particular, those skilled in the art will also add individual aspects as improvements or refinements to the respective basic form of the present invention.

BRIEF DESCRIPTION OF THE DRAWINGS

The present invention is described in greater detail below based on the exemplary embodiments specified in the schematic figures of the drawings. The following are shown.

In all figures, identical or functionally identical elements and devices have been provided with the same reference numerals, unless stated otherwise.

DETAILED DESCRIPTION

Figure 1:
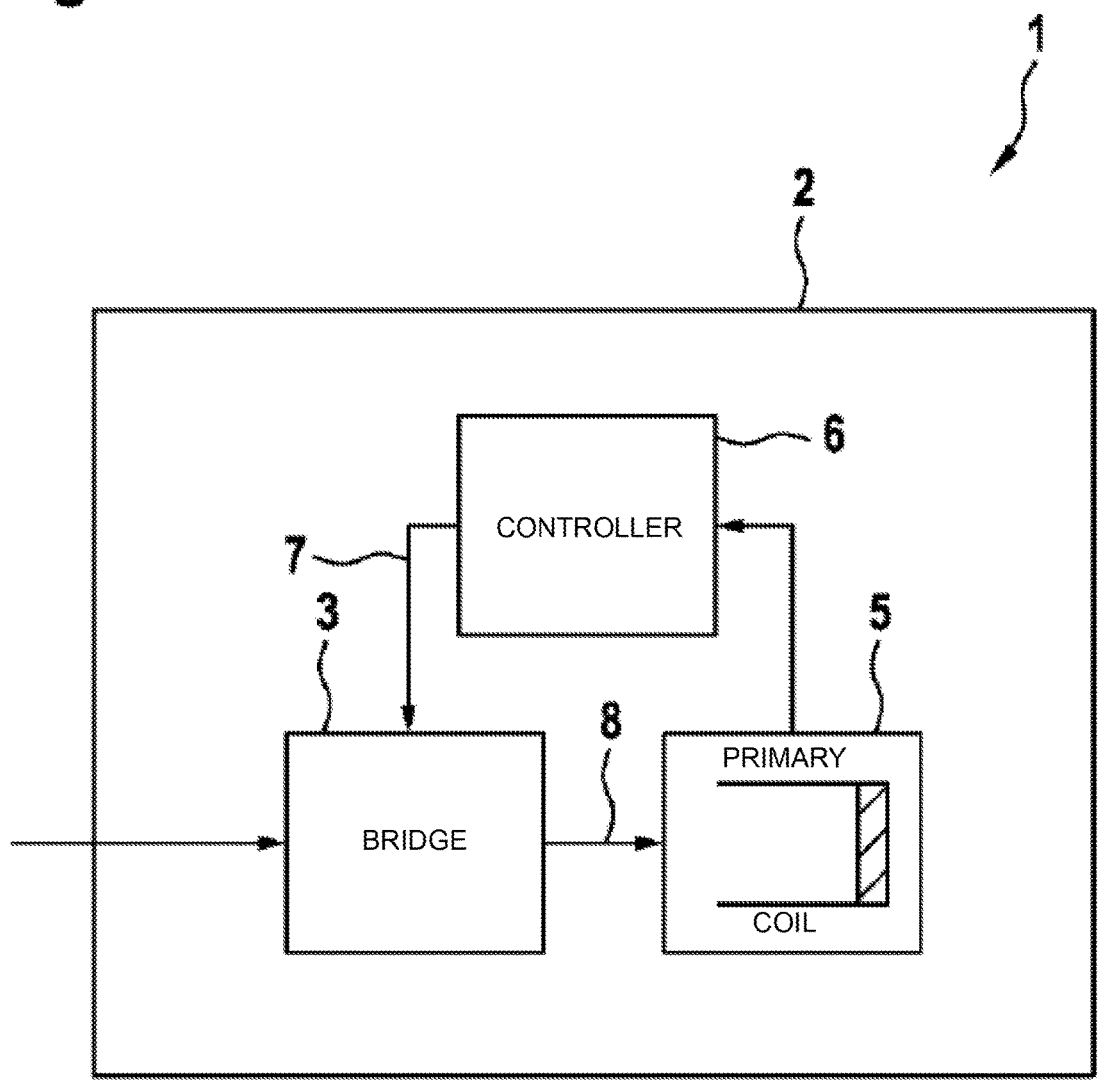
FIG. 1 shows a block diagram of one specific embodiment of a voltage converter according to the present invention.

FIG. 1 shows a block diagram of one specific embodiment of a voltage converter 1 according to the present invention.

In FIG. 1, only the primary side 2 of the voltage converter 1 according to the present invention is depicted. The secondary side 25 (see FIG. 3) may, for example, have a secondary coil 13 and additional required electrical components.

The primary side 2 has a full-bridge device 3 which is coupled to a primary coil 5. Furthermore, a control device 6 is coupled to the primary coil 5, which is designed to detect the current profile in the primary coil 5. The current 8 is provided to the primary coil 5 by the full-bridge device 3 for this purpose, which may be coupled to a DC voltage source 4 (see FIG. 3) for this purpose.

The control device 6 drives the full-bridge device 3 with the aid of one or multiple PWM signals 7. In one specific embodiment, the control device 6 drives the full-bridge device 3 with the aid of PWM signals 7 which have a duty cycle of 50%. For the actual control of the power or the current 8 or the voltage which the full-bridge device 3 transmits to the primary coil 5, the control device 6 may shift the phases of the PWM signals 7 relative to one another. As a result, the control device 6 is able to control the time during which the primary coil 5 is at the input voltage 4 in a positive direction or in a negative direction, or is short-circuited via the full-bridge device 3.

The control device 6 may detect the current profile in the primary coil 5 in different ways. Within the scope of the present invention, the detection of the current profile may be understood to be any measurement which allows an inference to be drawn about the current profile of the current 8 in the primary coil 5.

In particular, the control device 6 may detect the current profile in one specific embodiment via the detection of at least one current value in each case in an interval of the PWM signals 7 in which the primary coil 5 is coupled to the voltage source 4 via the full-bridge device 3, i.e., supplied with electrical energy from the voltage source 4.

The current profile of the primary coil 5 changes in the case of saturation of the primary coil 5 towards the end of the interval of the PWM signals 7 in which a current 8 flows through the primary coil 5. This change thus occurs shortly before entering the freewheeling phase, in which the primary coil 5 is short-circuited. For this reason, the control device 6 is able to detect the current value or the current values within the last 30 percent, in particular the last 20 percent or the last 10 percent, of the respective interval of the PWM signals 7.

In the case of an asymmetrical current 8 in the primary coil 5, the overall current profile in a PWM cycle is shifted either upward or downward relative to the current profile of the previous or following PWM cycle. For this reason, the control device 6 is able to detect the current value or the current values even in the center of the respective interval of the PWM signals 7. Here, the term "center" may be very broadly interpreted. The center of an interval of a PWM signal in which a current 8 flows through the primary coil 5 may, for example, lie in the center of a period of the PWM signals 7. However, the center may also lie in the center of the interval of the PWM signals 7 in which a current 8 flows through the primary coil 5. The term center may also mean a deviation of up to 30% from the actual center of the relevant cycle or interval.

In one specific embodiment, the control device 6 may also detect the current profile of the current 8 in the freewheeling phase of the primary coil 5. That is, in a phase in which the primary coil 5 is short-circuited. In the freewheeling phase, the current in the primary coil 5 slowly subsides. In this case, among other things, the absolute values of the subsiding current are a function of an asymmetry in the drive of the primary coil 5. The control device 6 may thus also draw an inference about an asymmetry in the drive of the primary coil 5 from the current in the freewheeling phase.

The control device 6 may also detect one or multiple measured values in each case in both intervals, i.e. in the interval of the PWM signals 7 in which the primary coil 5 is coupled to the voltage source 4 via the full-bridge device 3, and in the interval in which the primary coil 5 is not coupled to the voltage source 4, in order to detect the current profile in the primary coil 5.

Furthermore, the control device 6 may detect one current value in each case in two consecutive cycles of the PWM signals 7, and based on a difference between the current values, detect the current profile in the primary coil 5.

The control device 6 may also detect a single measured value in order to detect the current profile in the primary coil 5. Since, as already explained above, the absolute current values are influenced by an asymmetry in the drive of the primary coil 5, a single measured value is sufficient in order to detect the current profile.

Alternatively or additionally, the control device 6 may detect a plurality of measured values, which allow control device 6 to reconstruct the current profile in detail. For this purpose, in one specific embodiment, the control device 6 has analog/digital converters which provide a sufficiently high sampling rate.

Furthermore, in one specific embodiment, the control device 6 may detect only a few, for example, 2 to 10, measured values, and reconstruct at least the gradient of the current profile from the difference between the consecutive measured values in each case.

A combination of the aforementioned options for detecting the current profile in the primary coil 5 is also possible. As a result, for example, a redundant detection of the current profile is possible.

If the control device 6 has detected an asymmetry in the current 8 supplied to the primary coil 5, the control device 6 may correspondingly adjust the PWM signals 7 in order to balance this asymmetry. For example, the control device 6 may adjust the timing of the PWM signals 7 for the individual switching elements of the full-bridge device 3.

Figure 2:
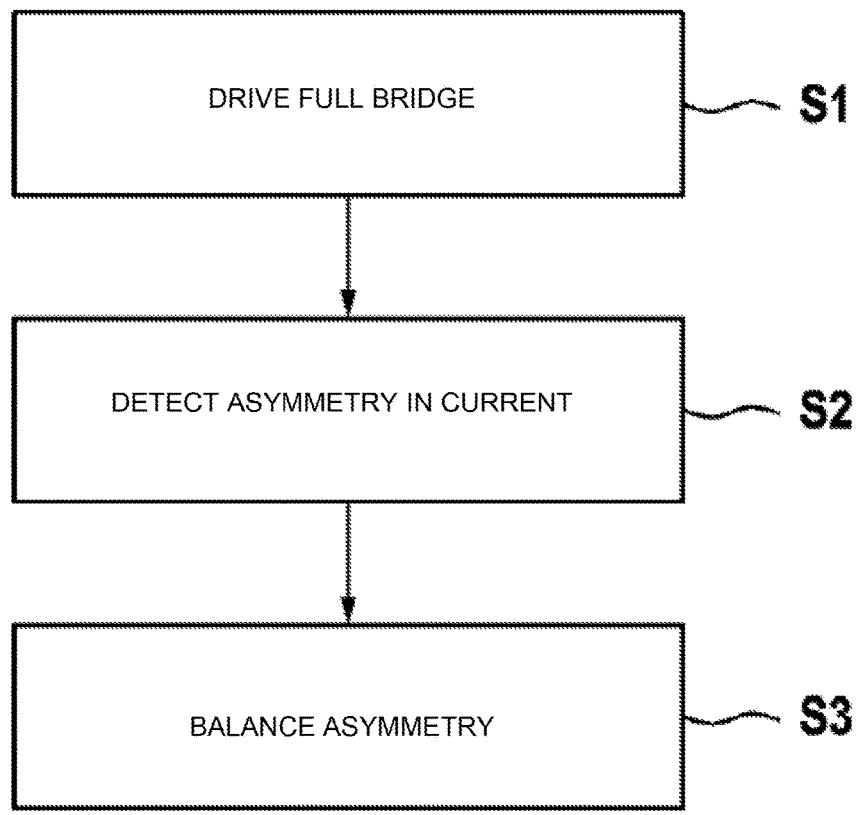
FIG. 2 shows a flow chart of one specific embodiment of a method according to the present invention.

FIG. 2 shows a flow chart of one specific embodiment of a method according to the present invention.

With the aid of the method according to the present invention, in particular a voltage converter 1 may be driven via a primary coil 5 supplied with a voltage by a full-bridge device 3.

In a first step 51, the method comprises driving the full-bridge device 3 via PWM signals 7. Here, the PWM signals 7 have in particular phases which are shifted relative to one another in order to control the power which the voltage converter 1 transmits.

In a second step S2, an asymmetry in the current 8 supplied to the primary coil 5 is detected based on a current profile in the primary coil 5.

Finally, in a third step S3, a detected asymmetry is balanced via an adjustment of the PWM signals 7.

In one specific embodiment of the method, the current profile in the primary coil 5 is detected in an interval of the PWM signals 7 in which the primary coil 5 is coupled to the voltage source 4 via the full-bridge device 3. In addition or alternatively, the at least one current value may be detected in an interval of the PWM signals 7 in which the primary coil 5 is not coupled to the voltage source 4 via the full-bridge device 3.

In one specific embodiment, the current value may be detected within the last 30 percent, in particular the last 20 percent or the last 10 percent, or in the center of the respective interval of the PWM signals 7.

In order to detect the current profile of the current 8 in the primary coil 5, a plurality of current values may be detected for reconstructing the current profile, or at least two current values may be detected, and the slope of the current profile in the primary coil 5 may be detected via the differentiation of the at least two current values.

In one specific embodiment, in two consecutive cycles of the PWM signals 7, one current value may be detected in each case, and the current profile in the primary coil 5 may be detected based on a difference between the current values.

Figure 3:
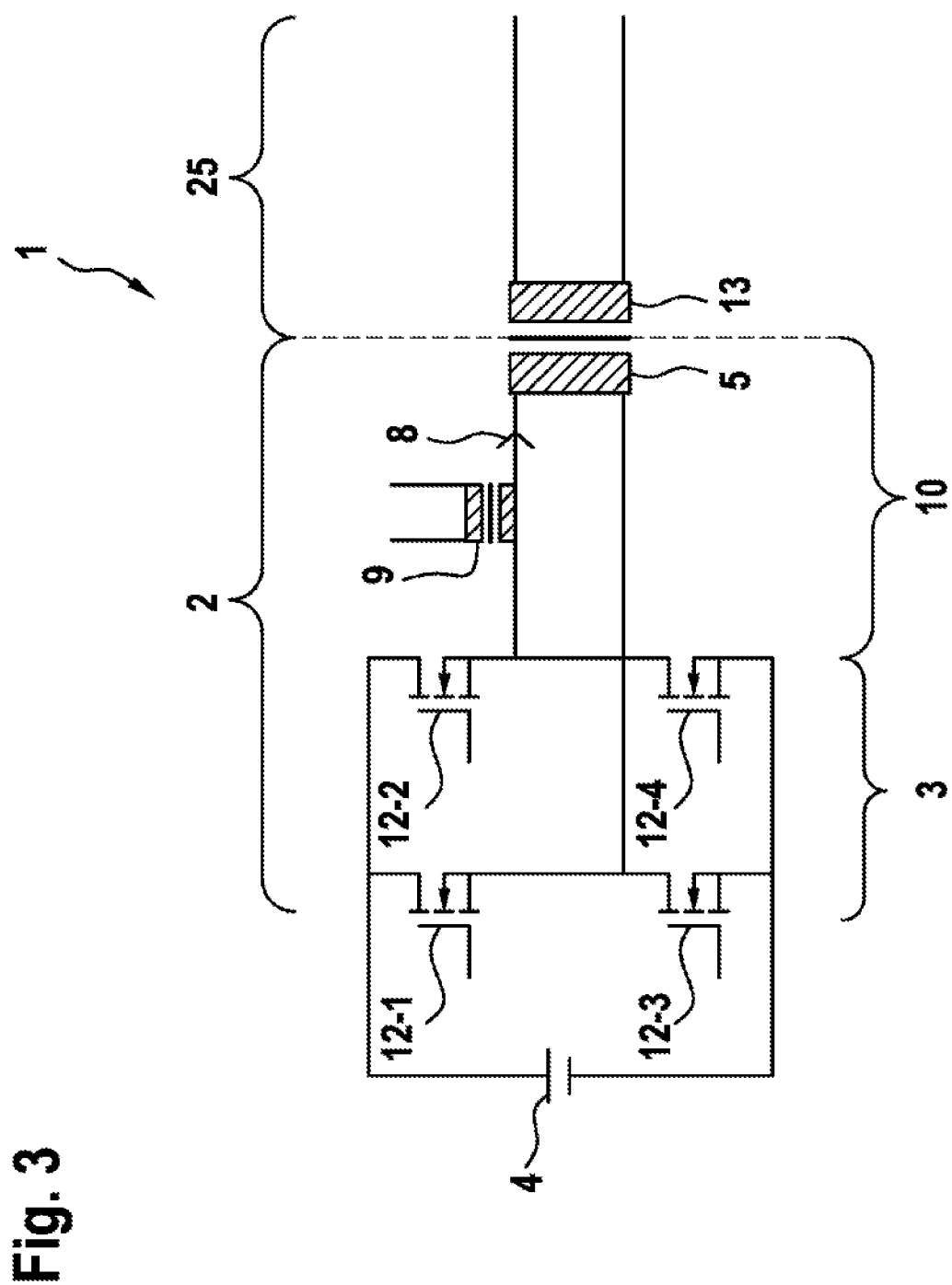
FIG. 3 shows a block diagram of an additional specific embodiment of a voltage converter according to the present invention.

FIG. 3 shows a block diagram of a further specific embodiment of a voltage converter 1 according to the present invention.

The voltage converter 1 of FIG. 3 has a full-bridge device 3 which includes switching elements 12-1 to 12-4. The two switching elements 12-1 and 12-2 are coupled to a voltage source 4 via a positive supply line. The two switching elements 12-3 and 12-4 are coupled to the voltage source 4 via a negative supply line. The two switching elements 12-1 and 12-3 are coupled to a first terminal of the primary coil 5 via a common node. Finally, the two switching elements 12-2 and 12-4 are likewise coupled to a second terminal of the primary coil 5 via a common node. The primary coil 5 is thus in the diagonal branch 10 of the full-bridge device 3. The secondary coil 13 of the converter transformer of the voltage converter 1 is arranged opposite the primary coil 5. Finally, a measuring transformer 9 is arranged at one of the connections between the full-bridge device 3 and the primary coil 5.

In the case of the primary coil 5 being cyclically supplied with current in the positive and the negative directions, the measuring transformer 9 is supplied with current in different directions in each case. As a result, it is prevented that the measuring transformer itself goes into saturation.

However, since the measuring transformer 9 only makes alternating currents measurable, no direct measurement of the DC component may be carried out in the primary coil 5.

Nevertheless, with the aid of a control device 6 according to the present invention, an asymmetry in current supply to the primary coil 5 may be detected and balanced via a suitable drive of the switching elements 12-1 to 12-4.

The switching elements 12-1 to 12-4 may be designed, for example, as transistors, for example, as FETs, MOSFETs, IGBTs, or the like.

The control device 6 is not depicted in FIG. 3. The control device 6 may, for example, be a program-controlled device 6 including at least one processor, microcontroller, or the like. The control device 6 may be arranged on the primary side 2 as well as on the secondary side 25.

Figure 4:
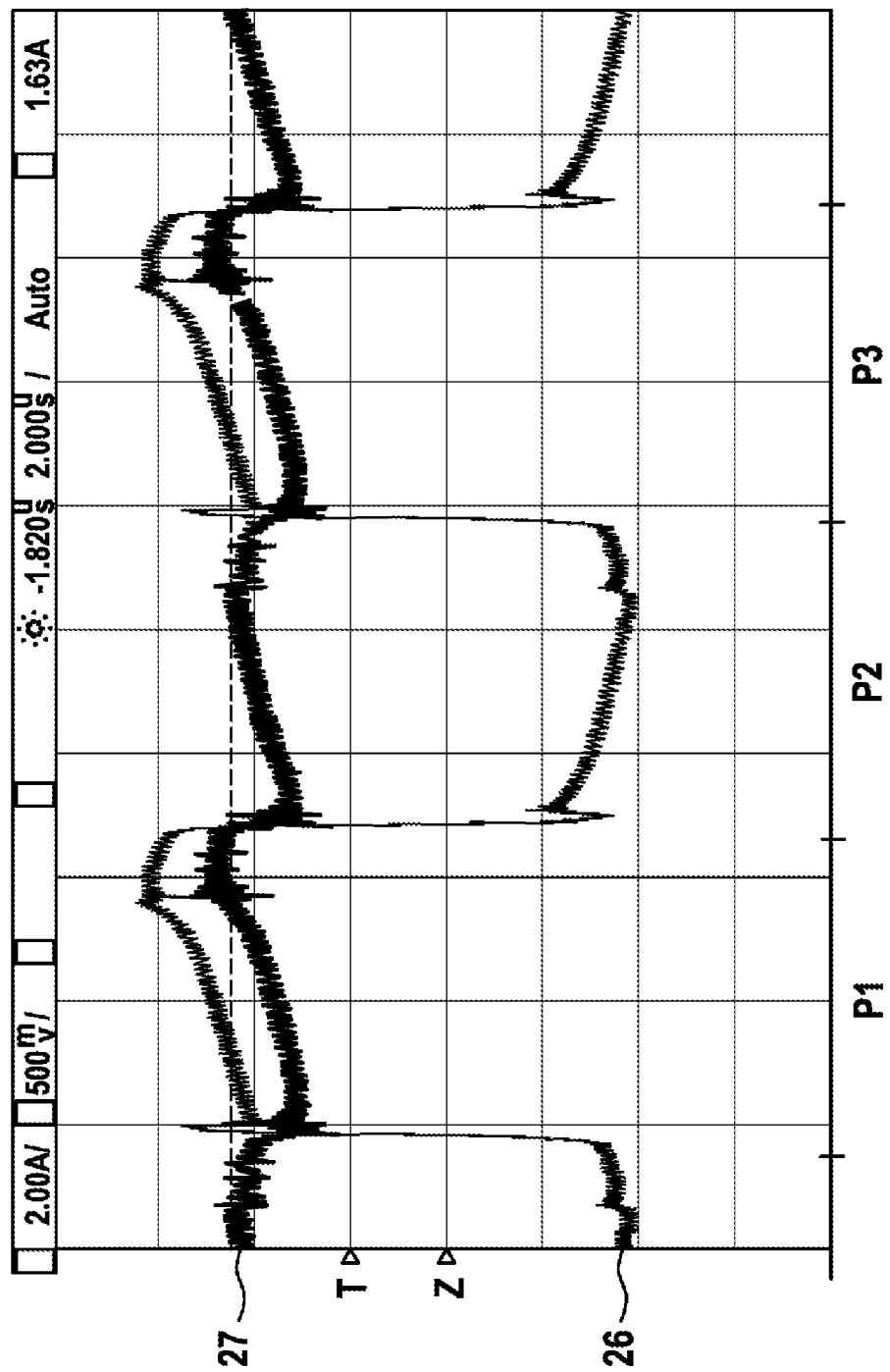
FIG. 4 shows a diagram of a current measurement in one specific embodiment of a voltage converter according to the present invention.

FIG. 4 shows a diagram of a current measurement in one specific embodiment of a voltage converter 1 according to the present invention.

Here, the current measurement was carried out in two ways. The curve 26 shows a current measurement via a current probe which is able to measure both positive and negative currents, as well as the DC component. The curve 27 shows a voltage measurement via a current sense transformer whose signal has been rectified and therefore detects only positive voltages. The horizontal axis of the diagram depicts 2 μs per interval, and the vertical axis of the diagram depicts 2 A per interval for the curve 26 or 500 mV per interval for the curve 27.

In FIG. 4, three complete periods P1 to P3 of the current 8, as produced via the PWM signals 7, are depicted. Here, the phases of the PWM signals 7 are shifted relative to one another in such a way that the freewheeling phase at the end of the each period P1 to P3 is approximately 20% of the respective period P1 to P3. The period duration is approximately 5 μs, which corresponds to a frequency of 200 kHz.

It is apparent in FIG. 4 that the current profile is approximately triangular in shape. Here, the current increases in the first phase, the driving phase, of the respective period P1 to P3, and decreases again in the freewheeling phase of the respective period P1 to P3.

It is also clearly apparent that the gradient of the current profile increases more steeply towards the end of the driving phase than would be the case with a linear current profile. This therefore indicates that the inductance of the primary coil 5 decreases towards the end of the driving phase. This is the case if the primary coil 5 reaches saturation.

The behavior of the curves 26, 27 depicted in FIG. 4, in which the current 8 increases more rapidly at the end of the respective driving phase than during the rest of the driving phase, occurs only in the case of saturation of the primary coil 5. However, such a saturation of the primary coil 5 occurs only if the current 8 exhibits an asymmetry. In FIG. 4, it is thus clear that a detection of current values of the current 8 in the primary coil 5 makes it possible to make an assertion about the current profile itself. In particular, it is also clear that the current profile itself may be used as the basis for making an assertion about an asymmetry in the current 8.

For example, an individual current value could be detected at the end of the driving phase in order to detect the increased current 8. A plurality of current values could also be detected in order to reconstruct the current profile in detail. A further option is to detect at least two current values and to determine a gradient of the current profile.

Finally, a further option is to detect an individual current value approximately in the center of the driving phase of a first period P1 to P3, and to detect an additional current value in the subsequent period P1 to P3 again at the same point in the driving phase. The difference between the detected current values thus allows an assertion to be made about an asymmetrical drive of the primary coil 5 via a current 8. For example, a threshold value may be predefined for the difference between the two current values, above the threshold of which the control device 6 correspondingly adjusts the PWM signals 7.

In the curve 27, it is also apparent that in the case of an asymmetry in the current 8, the current values also deviate from each other in the freewheeling phase. Thus, a formation of a difference between a current value detected in the freewheeling phase of a first period P1 to P3 and a current value detected in the freewheeling phase of a second period P1 to P3 may also be used for determining an asymmetry in the current 8.

Figure 5:
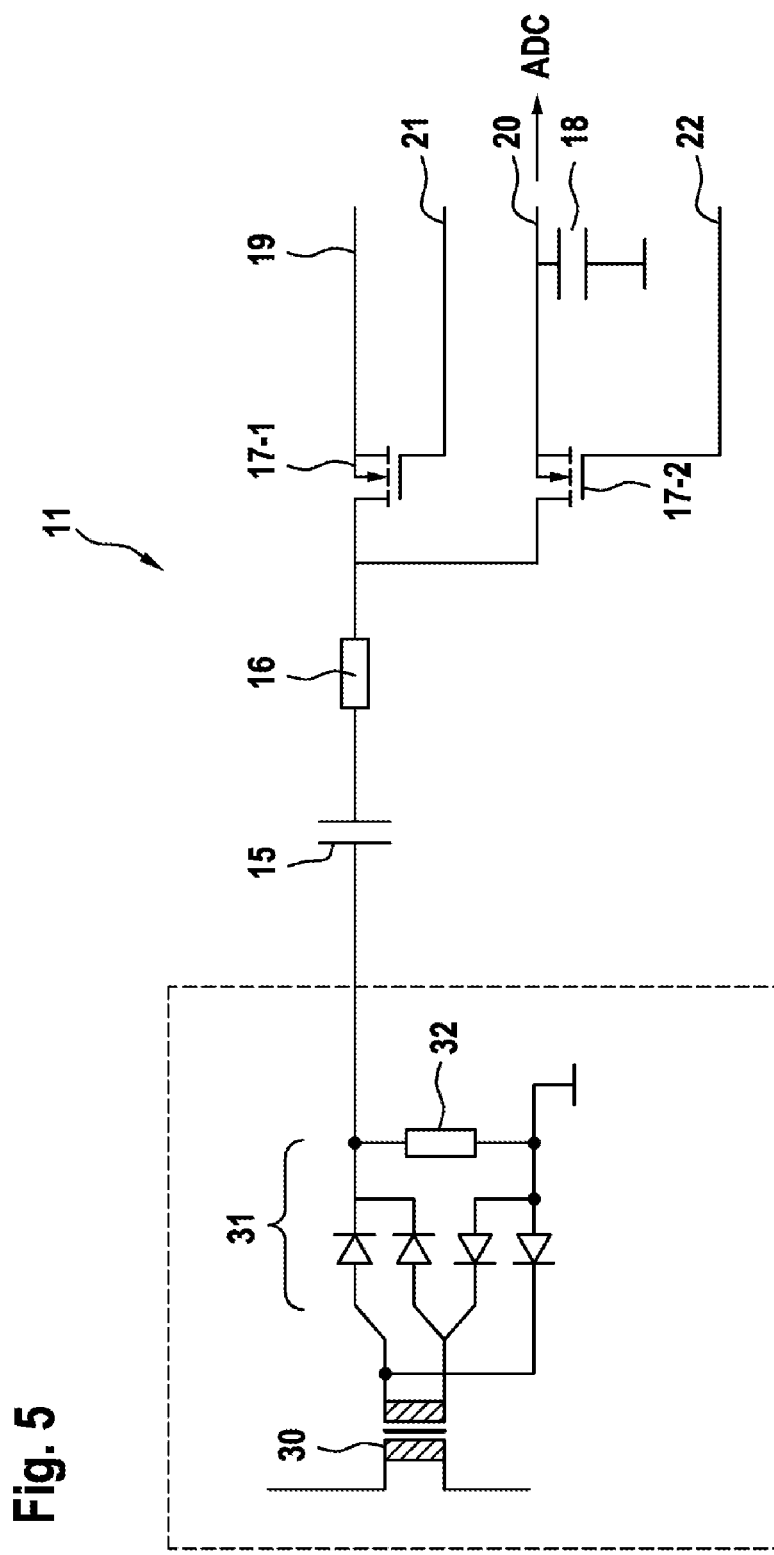
FIG. 5 shows a block diagram of one specific embodiment of a circuit including switched capacitors.
Figure 6:
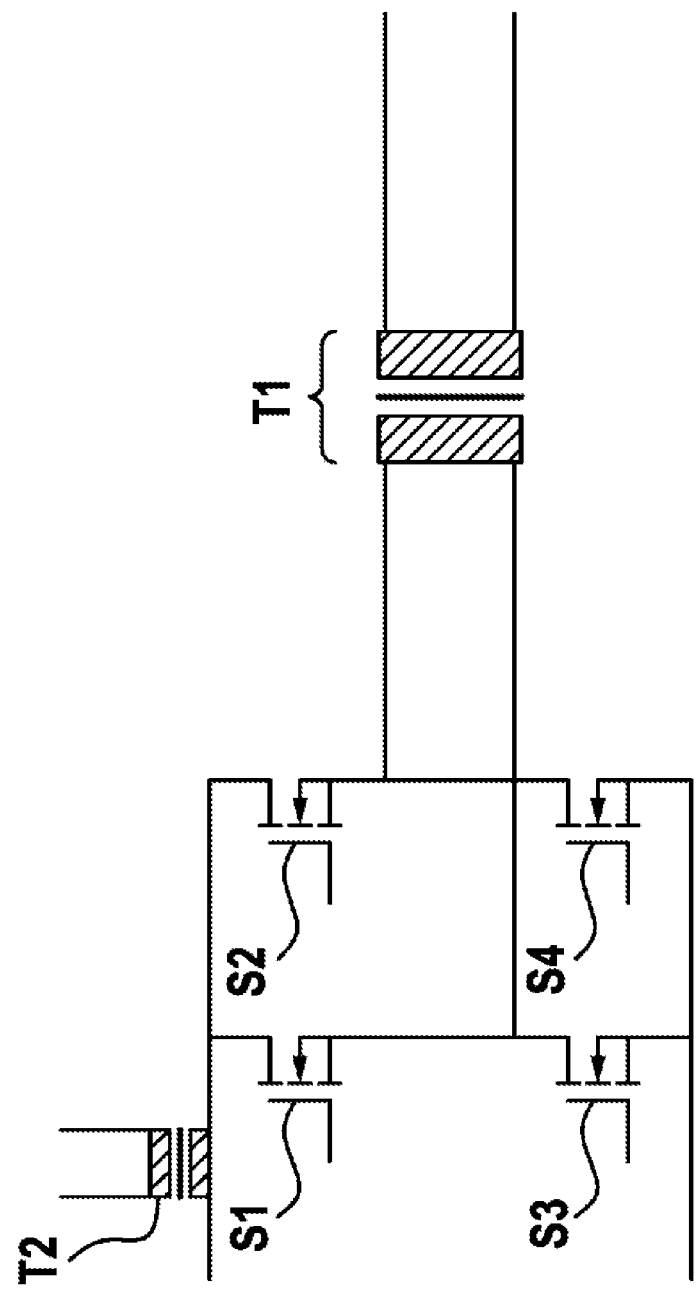
FIG. 6 shows a block diagram of a conventional voltage converter.

FIG. 5 shows a block diagram of one specific embodiment of a circuit including switched capacitors 11.

The circuit 11 has a terminal for the detected current signal which, in one specific embodiment, for example, is transmitted from the measuring transformer 30 via a rectifier 31 to a shunt resistor 32 which is coupled to a first capacitor 15 which is connected to a resistor 16. The resistor 16 is coupled to a parallel circuit made up of two switches 17-1 and 17-2. Furthermore, the switch 17-1 is coupled to a reference voltage 19. The switch 17-2 is coupled to a measurement voltage 20 which, for example, may be detected by the analog/digital converter of a processor. Furthermore, a capacitor 18 is connected to ground between the switch 17-2 and the measurement voltage 20. The switching inputs of the switches 17-1 and 17-2 are each driven by the control device 6 in such a way that in a first freewheeling phase, the capacitor 15 is charged to the voltage 20 to be measured, with respect to the reference voltage 19. In a second freewheeling phase, the capacitor 15 transmits the difference from the first freewheeling phase to the capacitor 18, at which the difference may be measured as a DC voltage, as a difference from the reference voltage. The difference between the voltage in the capacitor 15 and the measured voltage 20 thus results in a transfer of charge to the capacitor 18. No additional charge transfer takes place only if this capacitor 18 has a voltage which corresponds to this difference. The voltage at the capacitor 18 may subsequently be detected in a manner which is not time-critical via an analog/digital converter of the control device 6.

Although the present invention has been described above based on preferred exemplary embodiments, it is not limited thereto, but rather may be modified in a variety of ways. In particular, the present invention may be changed or modified in manifold ways without departing from the core of the present invention.

The invention claimed is:

1. A voltage converter (1)
having a primary side (2) which includes a full-bridge device (3) which is designed to receive a first DC voltage from a voltage source (4) having a first amplitude and to route it to a primary coil (5) arranged in the primary side (2);
including a control device (6) which is designed to drive the full-bridge device (3) via PWM signals (7) having predefined duty cycles and phases which are shifted relative to one another;
wherein the control device (6) is designed to detect an asymmetry in the current (8) supplied to the primary coil (5) based on a current profile in the primary coil (5);
wherein the control device (6) is designed to detect the current profile in the primary coil (5) via the detection of at least one current value in an interval of the PWM signals (7) in which the primary coil (5) is not coupled to the voltage source (4) via the full-bridge device (3) and when the primary coil (5) is short-circuited;
wherein the control device (6) is designed to balance a detected asymmetry via shifting phases of the PWM signals (7) against each other.

2. The voltage converter as claimed in claim 1,
including a measuring transformer (9) which is arranged in a diagonal branch (10) of the full-bridge device (3) and which is coupled to the control device (6) in order to provide a value of a current (8) in the primary coil (5) to the control device (6).

3. The voltage converter as claimed in claim 1,
characterized in that
the control device (6) is designed to detect the current profile in the primary coil (5) via the detection of at least one current value in each case in an interval of the PWM signals (7) in which the primary coil (5) is coupled to the voltage source (4) via the full-bridge device (3);
wherein the control device (6) is designed to detect the at least one current value within the last 30 percent of the respective interval of the PWM signals (7).

4. The voltage converter as claimed in claim 3,
characterized in that
the control device (6) is designed to detect the current profile in the primary coil (5) via the detection of a plurality of current values.

5. The voltage converter as claimed in claim 3,
characterized in that
the control device (6) is designed to detect one current value in each case in two consecutive cycles of the PWM signals (7), and based on a difference between the current values, to detect the current profile in the primary coil (5).

6. The voltage converter as claimed in claim 3,
characterized in that
that the control device (6) is designed to detect two current values and to detect the slope of the current profile in the primary coil (5) via the differentiation of the two current values.

7. The voltage converter as claimed in claim 3,
characterized in that
the control device (6) has a circuit including switched capacitors (11) which is designed to detect the difference between the current values in two consecutive cycles of the PWM signals (7), wherein the control device (6) is designed to detect the current profile in the primary coil (5) based on the detected difference.

8. The voltage converter as claimed in claim 1,
characterized in that
the control device (6) is designed to detect the current profile in the primary coil (5) via the detection of at least one current value in each case in an interval of the PWM signals (7) in which the primary coil (5) is coupled to the voltage source (4) via the full-bridge device (3);
wherein the control device (6) is designed to detect the at least one current value within the last 20 percent of the respective interval of the PWM signals (7).

9. The voltage converter as claimed in claim 1,
characterized in that
the control device (6) is designed to detect the current profile in the primary coil (5) via the detection of at least one current value in each case in an interval of the PWM signals (7) in which the primary coil (5) is coupled to the voltage source (4) via the full-bridge device (3);
wherein the control device (6) is designed to detect the at least one current value within the last 10 percent of the respective interval of the PWM signals (7).

10. The voltage converter as claimed in claim 1,
characterized in that
the control device (6) is designed to detect the current profile in the primary coil (5) via the detection of at least one current value in each case in an interval of the PWM signals (7) in which the primary coil (5) is coupled to the voltage source (4) via the full-bridge device (3);
wherein the control device (6) is designed to detect the at least one current value in the center of the respective interval of the PWM signals (7).

11. The voltage converter as claimed in claim 10,
characterized in that
the control device (6) is designed to detect the current profile in the primary coil (5) via the detection of a plurality of current values.

12. The voltage converter as claimed in claim 10,
characterized in that
the control device (6) is designed to detect two current values and to detect the slope of the current profile in the primary coil (5) via the differentiation of the two current values.

13. A method for controlling a voltage converter (1) having a primary coil (5) supplied with a voltage via a full-bridge device (3), including the steps of:
driving (S1) the full-bridge device (3) via PWM signals (7) having predefined duty cycles and phases which are shifted relative to one another;
detecting a current profile in the primary coil (5) via the detection of at least one current value in an interval of the PWM signals (7) in which the primary coil (5) is not coupled to a voltage source (4) via the full-bridge device (3) and when the primary coil (5) is short-circuited;

detecting (S2) an asymmetry in the current (8) supplied to the primary coil (5) based on the current profile in the primary coil (5); and balancing (S3) a detected asymmetry via shifting phases of the PWM signals (7) against each other.

14. The method as claimed in claim 13, wherein the current profile in the primary coil (5) is detected via the detection of at least one current value in an interval of the PWM signals (7) in which the primary coil (5) is coupled to the voltage source (4) via the full-bridge device (3), wherein the at least one current value is detected within the last 30 percent; and/or wherein the current profile in the primary coil (5) is detected via the detection of at least one current value in an interval of the PWM signals (7) in which the primary coil (5) is not coupled to the voltage source (4) via the full-bridge device (3).

15. The method as claimed in claim 14, wherein the current profile in the primary coil (5) is detected during the detection of the current profile in the primary coil (5) via the detection of a plurality of current values; or wherein at least two current values are detected, and the slope of the current profile in the primary coil (5) is detected via the differentiation of the at least two current values.

16. The method as claimed in claim 14, wherein one current value is detected in each case in two consecutive cycles of the PWM signals (7), and the current profile in the primary coil (5) is detected based on a difference between the current values; or wherein the difference between current values is detected in multiple consecutive cycles of the PWM signals (7) by means of a circuit including switched capacitors (11), wherein the current profile in the primary coil (5) is detected based on the detected difference.

17. The method as claimed in claim 13, wherein the current profile in the primary coil (5) is detected via the detection of at least one current value in an interval of the PWM signals (7) in which the primary coil (5) is coupled to the voltage source (4) via the full-bridge device (3), wherein the at least one current value is detected within the last 20 percent; and/or wherein the current profile in the primary coil (5) is detected via the detection of at least one current value in an interval of the PWM signals (7) in which the primary coil (5) is not coupled to the voltage source (4) via the full-bridge device (3).

18. The method as claimed in claim 13, wherein the current profile in the primary coil (5) is detected via the detection of at least one current value in an interval of the PWM signals (7) in which the primary coil (5) is coupled to the voltage source (4) via the full-bridge device (3), wherein the at least one current value is detected within the last 10 percent; and/or wherein the current profile in the primary coil (5) is detected via the detection of at least one current value in an interval of the PWM signals (7) in which the primary coil (5) is not coupled to the voltage source (4) via the full-bridge device (3).

19. The method as claimed in claim 13, wherein the current profile in the primary coil (5) is detected via the detection of at least one current value in an interval of the PWM signals (7) in which the primary coil (5) is coupled to the voltage source (4) via the full-bridge device (3), wherein the at least one current value is detected in the center of the respective interval of the PWM signals (7); and/or wherein the current profile in the primary coil (5) is detected via the detection of at least one current value in an interval of the PWM signals (7) in which the primary coil (5) is not coupled to the voltage source (4) via the full-bridge device (3).

* * * * *